Oct. 11, 1927.
J. S. GALESKI
1,644,776
SPECTACLES
Filed May 19, 1926
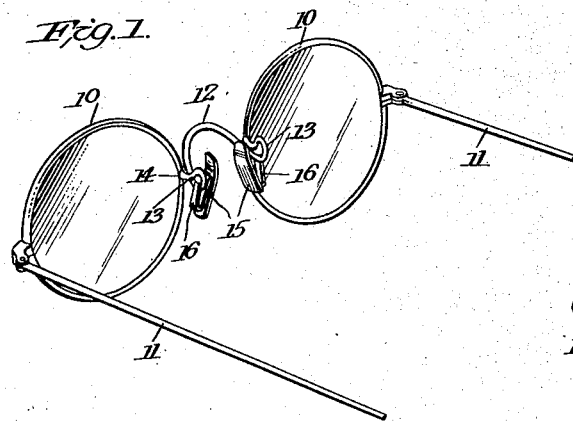
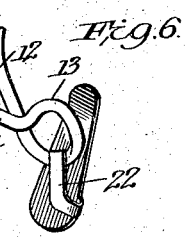
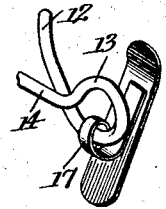
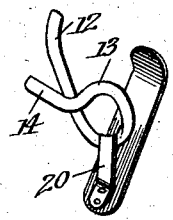
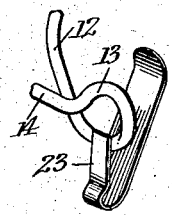
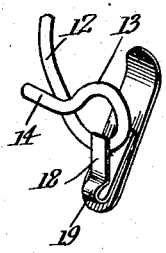
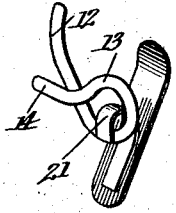
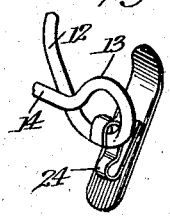
Inventor
Joseph S. Galeski.
By *Cushman Buydoit Warby*
Attorneys Patented Oct. 11, 1927.

1,644,776

UNITED STATES PATENT OFFICE.

JOSEPH S. GALESKI, OF RICHMOND, VIRGINIA.

SPECTACLES.

Application filed May 19, 1926. Serial No. 110,242.

The present invention relates to nose bridges for spectacles, and has for its object to provide a construction in which various adjustments of the lenses relative to the bridge may be readily made, without danger of changing the centers of the lenses horizontally relative to the bridge, and such adjustments may be made by unskilled operators without distorting or interfering with the relation of the bridge piece, the nose pads, where used, and the lenses.

For example, one adjustment not infrequently desired is to move the lenses toward or from the eyes. Vertical adjustments of the lenses are also not unusual, and all of these adjustments must be made without disturbing the relation of the bridge and pads to one another. By my improved construction, as herein disclosed, this may be readily accomplished.

Furthermore, and as part of the present invention, there is provided a novel form of nose pad which, when combined with my improved bridge piece in the manner hereinafter disclosed, gives a very satisfactory and self-adjusting spectacle support to engage the nose of the wearer without discomfort.

In my Patent No. 1,352,887, dated September 14, 1920, I have shown a nose bridge in which provision is made for adjustments, and in that construction there is disclosed a nose pad, which is integral with the bridge wire and lens supporting member. The bridge piece of my patent, while of excellent construction, is not designed to be handled by unskilled operators, for the integral formation is such that great care must be exercised in making the adjustments contemplated in that disclosure to prevent distortion of the parts so that there will be no derangement of the lenses or distortion of the bridge and the nose pads. Furthermore, the nose pads must be very carefully fitted and adjusted in order to give and maintain proper relation to the nose.

It is to improve upon that general type of nose bridge that I have developed the present invention.

In order that the invention may be clear to those skilled in the art, I have shown in the accompanying drawings, which form a part of this application, embodiments of my invention, but it will be understood that these are illustrative and not restrictive, and equivalent mechanical expedients for those herein shown may be adopted.

In the drawings:—

Figure 1 is a perspective view of a pair of spectacles equipped with my improved nose bridge.

Figures 2 to 8, inclusive, illustrate variations in nose pad constructions with which my improved nose bridge may be equipped.

Referring to the drawings by numbers, like numbers indicating like parts in the several views, 10 indicates the lens frames with the usual temples 11. While I have shown lens frames, it will be understood that the invention is equally applicable to rimless glasses.

Between the lenses is the nose bridge 12, which, as here shown, is placed at an angle of approximately forty-five degrees (45°), although this may be varied to suit the nose of the wearer. The limbs of the nose bridge 12 are bent to form loops 13, and then project forwardly to the lenses, where they are attached to the rims 10 or any other selected type of lens engaging member. I have shown in the present disclosure substantially round loops 13, but it will be understood that they might take other forms, and in the use of the term "loop" I mean to indicate not only the substantially round loops shown, but loop formations of other shapes.

This construction gives to the nose piece 12 and the lens supports 14, a single, substantially vertically disposed, rearwardly extending loop 13 on each side of the bridge piece, providing an excess of material for making the necessary adjustments. This loop, providing the excess material, may be manipulated to move the lenses to various adjustments, without the necessity or danger of changing the relation of the nose piece and pads.

This ease of adjustment, without danger of altering the relation of the parts is very desirable when the fitting of spectacles is in the hands of relatively unskilled operators, for they may effect these adjustments readily and without any danger of off-centering the lenses or changing their positions relative to the nose piece, so that the glasses, once fitted, may be quickly adjusted for lens and eye relation, without disturbing the fitting.

In spectacles of this bridge type, it is desirable that the bridge engage the nose only slightly, and that the weight of the glasses upon the bridge of the nose be relieved as much as possible. This is accomplished by providing nose pads, as for example, in my patent above referred to, where an integral loop was drawn down and formed a nose pad. Such nose pads as disclosed in my former patent, however, while giving excellent results, if properly adjusted, require a very careful adjustment, and they are not in any true sense, self-adjusting, after having been once brought to an adjusted position.

The present invention provides a nose pad construction, which, while entirely sufficient to support the glasses and relieve the bridge of the nose from the weight of the nose piece, will adjust themselves automatically and readily to the sides of the nose, and do not require the careful fitting of the nose pads of the earlier art. The nose pads 15, as shown in Figure 1, are of light material and may be finished on their contact surface in any desired way suitable for easy contact with the nose. These pads are resiliently mounted, and such mounting may be effected in different ways. In Figure 1, there is provided a substantially U-shaped resilient member 16, one limb of which is secured to the pad 15, and the other limb of which extends upwardly and is secured in any suitable manner to the underpart of the loop 13. This spring arm being of light resilient metal, yields readily, and produces only a soft spring pressure of the pads upon the nose. The construction is such that the pads will readily adjust themselves, there being clearance enough between the loops 13 and the pads 15 to allow of sufficient adjustment to permit the bridge 12 to seat itself comfortably and without undue pressure upon the nose. When it is desired to give the nose pads 15 a permanent set at a certain angle, this may be readily accomplished by giving a slight axial twist to the loop 13 in one direction or the other, thereby changing the angular positions of the nose pads.

It is obvious that the nose pads may take different forms, and I have shown some of the variations in Figures 2 to 8 of the drawings.

In Figure 2, the substantially U-shaped resilient arm 17 is given a coil at one end to increase its resiliency. In the form shown in Figure 3, the substantially U-shaped supporting arm 18 is provided with the spring coil 19 between its ends.

In Figure 4 is shown a straight resilient supporting arm 20 secured at its lower end to the nose pad.

In Figure 5, the position of the substantially U-shaped arm 21 is reversed, and its limbs project downwardly to engage the nose pad and the loop 13.

In the form shown in Figure 6, the pad is provided with a resilient arm 22 projecting laterally from the side of the pad and then upwardly to engage the loop 13.

In the form shown in Figure 7, an integral pad supporting arm 23 is provided, which projects rearwardly and upwardly from the lower end of the pad, with its end engaging the loop 13.

In the form of the invention shown in Figure 8, the supporting arm 24 is substantially S-shaped, with one end connected to the pad, and the other end connected to the loop, so as to give a double spring coil action.

While I have shown the invention as applied to spectacles, and it is primarily intended for that, it will be understood that it may be adapted, so far as it is applicable, not only to spectacles, but to eye glasses, lorgnettes, or whatever type it is useful with.

I claim:—

1. In a device of the class described, a pair of lens supports, a nose bridge terminating at each end in a substantially horizontal arm connected to the adjacent lens support, a substantially vertical loop between each arm and the bridge to provide an excess of material for adjustment, said loop being positioned to the rear and on the outside of the bridge, and a resilient nose pad secured to the under side of each of the loops whereby the lens supports may be adjusted relative to the bridge without disturbing the fixed adjustment of the nose pad.

2. In a device of the class described, a pair of lens supports, a nose bridge terminating at each end in a substantially horizontal arm connected to the adjacent lens support, a substantially vertical loop between each arm and the bridge to provide an excess of material for adjustment, said loop being positioned to the rear and on the outside of the bridge, and a nose pad having an upwardly extending resilient arm provided with a curved spring portion between its ends secured to the under side of each of said loops whereby the lens supports may be adjusted relative to the bridge without disturbing the fixed adjustment of the nose pad.

In testimony whereof I have hereunto set my hand.

JOSEPH S. GALESKI.